April 3, 1928.
W. F. HOHORST
1,664,416
LIQUID LEVEL INDICATOR
Filed Aug. 28, 1924
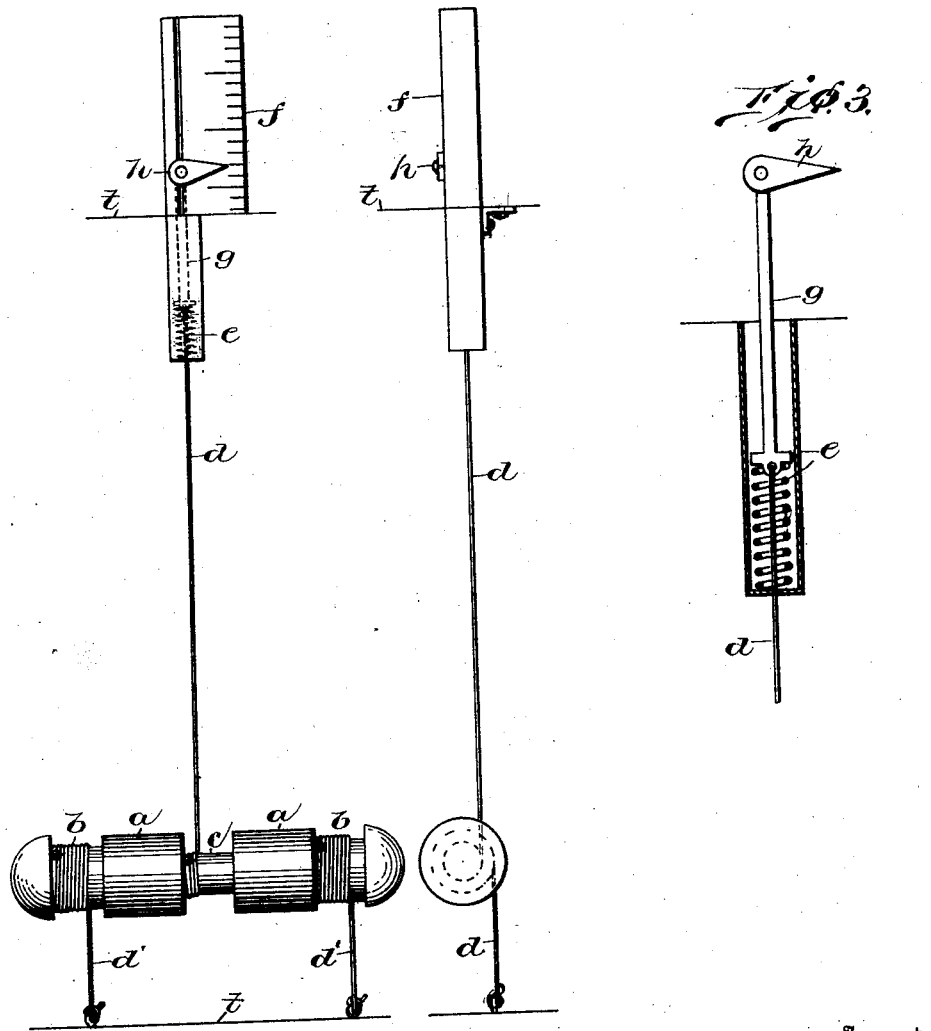

Patented Apr. 3, 1928.

1,664,416

UNITED STATES PATENT OFFICE.

WILLIAM F. HOHORST, OF MONROVIA, CALIFORNIA.

LIQUID-LEVEL INDICATOR.

Application filed August 28, 1924. Serial No. 734,782.

This invention relates to gages and more particularly to gages whereby the quantity of liquid in an enclosure is made known through the buoyancy of a float on the inside, acting on a scale on the outside.

The general object of my invention is to provide a simple, inexpensive, non-fouling gage that will always be dependable.

Reference is to be had to the accompanying drawings forming a part of the specification, it being understood that the drawings are merely illustrative of one embodiment of the invention.

Figure 1 is a front elevation of the gage embodying my invention.

Figure 2 is a side elevation of the gage illustrated in Figure 1.

Figure 3 is a detail view of the indicator and means for actuating same.

A roller float $a$ is provided with drums $b$, $b$ and $c$. Drums $b$ and $b$ act in unison and have the greater circumference. Winding leads $d'$ are attached to the bottom of the tank $t$ or other receptacle on the one hand and to the respective drums $b$ and $b$ on the other hand. Intermediate drum $c$ has a lesser circumference and its single lead $d$ is attached to the gage indicator on the one hand and to the drum $c$ on the other hand. The gage indicator itself is mounted on the top of the tank $t$. The gage indicator comprises a gage rod $g$ which is actuated by a compression spring $e$ tending to keep the pointer $h$ at the top of the scale $f$. The compression spring $e$ maintains sufficient tension on the lead $d$ to hold the float $a$ in position without interfering with its buoyancy. In operation the lead $d'$ unravels sufficiently far, depending on the amount of liquid in the tank, to give the pointer $h$ of the gage indicator a displacement along the scale $f$ substantially proportional to the height of the contained liquid.

The advantages of a gage of this kind as described herewith are the few parts used, the direct leads to the scale, and the elimination of guides necessary to maintain the float in position.

Having described my invention I claim:

1. In combination with a tank and a spring pressed gage indicator mounted on said tank, a roller float within said tank having winding drums, two of large and one of smaller diameter, winding leads two severally attached to the two large drums and both attached to the bottom of said tank and another lead attached to the smaller drum and to said gage indicator to actuate said gage indicator.

2. In combination, in a liquid gage for indicating the level of liquid in containers, indicating means mounted on said container, a roller float within said container having winding drums two of larger and one of smaller diameter, winding leads two severally attached to the two large drums and both attached to the bottom of said container, a second winding lead attached to the other of said drums and to said indicating means, and means adapted to keep the last mentioned lead taut.

In testimony whereof I affix my signature.

WILLIAM F. HOHORST.